United States Patent
Kuroki

(10) Patent No.: US 9,306,487 B2
(45) Date of Patent: Apr. 5, 2016

(54) MOTOR DRIVE DEVICE HAVING FUNCTION OF DETECTING CONTACT FUSION IN ELECTROMAGNETIC CONTACTOR

(71) Applicant: FANUC CORPORATION, Yamanashi (JP)

(72) Inventor: Wataru Kuroki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/667,762

(22) Filed: Mar. 25, 2015

(65) Prior Publication Data

US 2015/0280632 A1  Oct. 1, 2015

(30) Foreign Application Priority Data

Mar. 28, 2014  (JP) ................................ 2014-070068

(51) Int. Cl.

| H02P 7/14 | (2006.01) |
|---|---|
| H02P 23/00 | (2006.01) |
| H02P 25/00 | (2006.01) |
| H02P 27/04 | (2006.01) |

(52) U.S. Cl.
CPC ............ *H02P 27/04* (2013.01); *H02P 2201/03* (2013.01)

(58) Field of Classification Search
CPC ............................. H02P 27/04; H02P 2201/03
USPC .......................................................... 318/504
See application file for complete search history.

(56) References Cited

PUBLICATIONS

Product information fof Hitachi Industrial Equipment Systems Co., Ltd. retrieved from the Internet: URL:http://www.hitachi-ies.Co.jp/english/products swiches/mgsw/index.htm, (2002-2015), 8 pgs.

*Primary Examiner* — Erick Glass
(74) *Attorney, Agent, or Firm* — Fredrikson & Byron, P.A.

(57) ABSTRACT

A motor drive device driven by a three-phase AC, which drives a motor by an AC/DC converter and DC/AC converter controlled by a controller, and which has an electromagnetic contactor without an auxiliary contact in an input power circuit, which motor control device is provided at the controller with an off circuit of the electromagnetic contactor and a partial controller of the three-phase bridge circuit at the AC/DC converter, turns on an upper arm of a predetermined phase of the three-phase bridge circuit and turns on the lower arms of other phases in the state where the electromagnetic contactor is turned off, judges the presence of current in this state by the current detector, and, when the current detector detects current, uses a contact fusion detector to detecte contact fusion in the electromagnetic contactor and thereby can detect fusion of a contact in the electromagnetic contactor without an additional circuit.

4 Claims, 5 Drawing Sheets

MOTOR DRIVE DEVICE HAVING FUNCTION OF DETECTING CONTACT FUSION IN ELECTROMAGNETIC CONTACTOR

BACKGROUND OF THE INVENTION

1. Field of the Invention

The present invention relates to a motor drive device which has the function of detecting contact fusion in an electromagnetic contactor by utilizing a function originally provided in the motor drive device.

2. Description of the Related Art

The motor drive device which drives a machine tool or industrial machine, robot, etc. receives as input power a three-phase alternating current. This is converted at an AC/DC converter to a direct current voltage. The converted direct current voltage is converted at a DC/AC converter to a desired frequency of alternating current to drive the motor. In such a motor drive device, an electromagnetic contactor is set at an input power line to the AC/DC converter.

An electromagnetic contactor has a built-in contact. When the electromagnetic contactor is turned on, the contact is closed to make the input side and output side of the electromagnetic contactor conductive, while when the electromagnetic contactor is turned off, the contact is opened to break the conduction of the input side and output side of the electromagnetic contactor. In the electromagnetic contactor which is set at the input power line, at the time of an emergency stop or alarm, the electromagnetic contactor is turned off so as to open the contact and separate the motor drive device from the power supply. If the contact of the electromagnetic contactor is opened, the supply of energy from the power supply is stopped and the motor stops operating.

However, sometimes the load of the motor becomes large and an excessive current flows to the electromagnetic contactor and sometimes long years of use of the motor drive device causes the contact of the electromagnetic contactor to fuse. If the contact of the electromagnetic contactor fuses, even if the electromagnetic contactor is turned off, the contact will not open, current to the motor will not be able to be cut off, and unexpected operation of the motor may cause a dangerous situation.

As a countermeasure to this, for the electromagnetic contactor which is set at the input power line of the motor drive device, one which is provided with an auxiliary contact is used. The auxiliary contact is a contact which operates linked with the main contact of the electromagnetic contactor and is used to detect fusion of the main contact. Further, when detecting fusion of the main contact of the electromagnetic contactor, the method is generally adopted of stopping the motor driving the machine, turning the electromagnetic contactor on/off in the state where the motor is not consuming energy, and monitoring the opened/closed state of the auxiliary contact of the electromagnetic contactor at this time. Such an auxiliary contact of an electromagnetic contactor is, for example, disclosed in the product information of the site of Hitachi Industrial Equipment Systems Co., Ltd., Standard Type Electromagnetic Contactors, Switches [HS Series] (http://www.hitachi-ies.co.jp/products/hdn/mgsw/).

However, in such a method of detection of fusion of a contact in an electromagnetic contactor, an electromagnetic contactor with an auxiliary contact is necessary and an additional circuit for monitoring the auxiliary contact is necessary inside or outside the motor drive device, so there is the issue that this leads to an increase in costs.

SUMMARY OF INVENTION

In one aspect, the present invention has as its object the realization of a motor drive device which, when detecting fusion of a contact in an electromagnetic contactor, does not require an auxiliary contact at the electromagnetic contactor and does not need an additional circuit and which utilizes a function originally provided in the motor drive device so as to detect fusion of a contact in the electromagnetic contactor without an accompanying increase in costs.

According to one aspect of the present invention, there is provided a motor drive device which comprises an AC/DC converter which converts an alternating current voltage which is supplied from a three-phase alternating current power supply to a direct current voltage, a detection circuit of the input power voltage, and a detection circuit of the input current, in which motor drive device, the AC/DC converter comprising a three-phase bridge circuit comprised of a switching device and a diode, and the detection circuit of an input power voltage and detection circuit of an input current having an electromagnetic contactor which turns the input power line on/off set between them, the motor drive device provided with the following: an off circuit of the electromagnetic contactor for turning off the electromagnetic contactor in the state charged by the direct current voltage of said AC/DC converter; a partial controller of the three-phase bridge circuit for turning on the upper arm of one phase of the three-phase bridge circuit for the phase with the lowest input voltage and for turning on the lower arm of one phase of the three-phase bridge circuit for the phase with the highest input in the state where the off circuit of the electromagnetic contactor turns off the electromagnetic contactor; a current detector for detecting if current is flowing or not flowing in the state where the partial controller of the three-phase bridge circuit has turned on the upper arm of one phase and the lower arm of one phase; and a contact fusion detector whereby the current detector detects the electromagnetic contactor is normal when not detecting current and the current detector detects that it has a fused contact when detecting current in the state where the partial controller of the three-phase bridge circuit turns on the upper arm of one phase and the lower arm of one phase.

According to the motor drive device according to one aspect of the present invention, the electromagnetic contactor with an auxiliary contact becomes unnecessary and an additional circuit for detection of contact fusion also becomes unnecessary, so there is the effect that it becomes possible to detect contact fusion in the electromagnetic contactor without an accompanying rise in costs.

BRIEF DESCRIPTION OF THE DRAWINGS

The present invention will be understood more clearly by referring to the drawings attached below.

DETAILED DESCRIPTION

Figure 1:
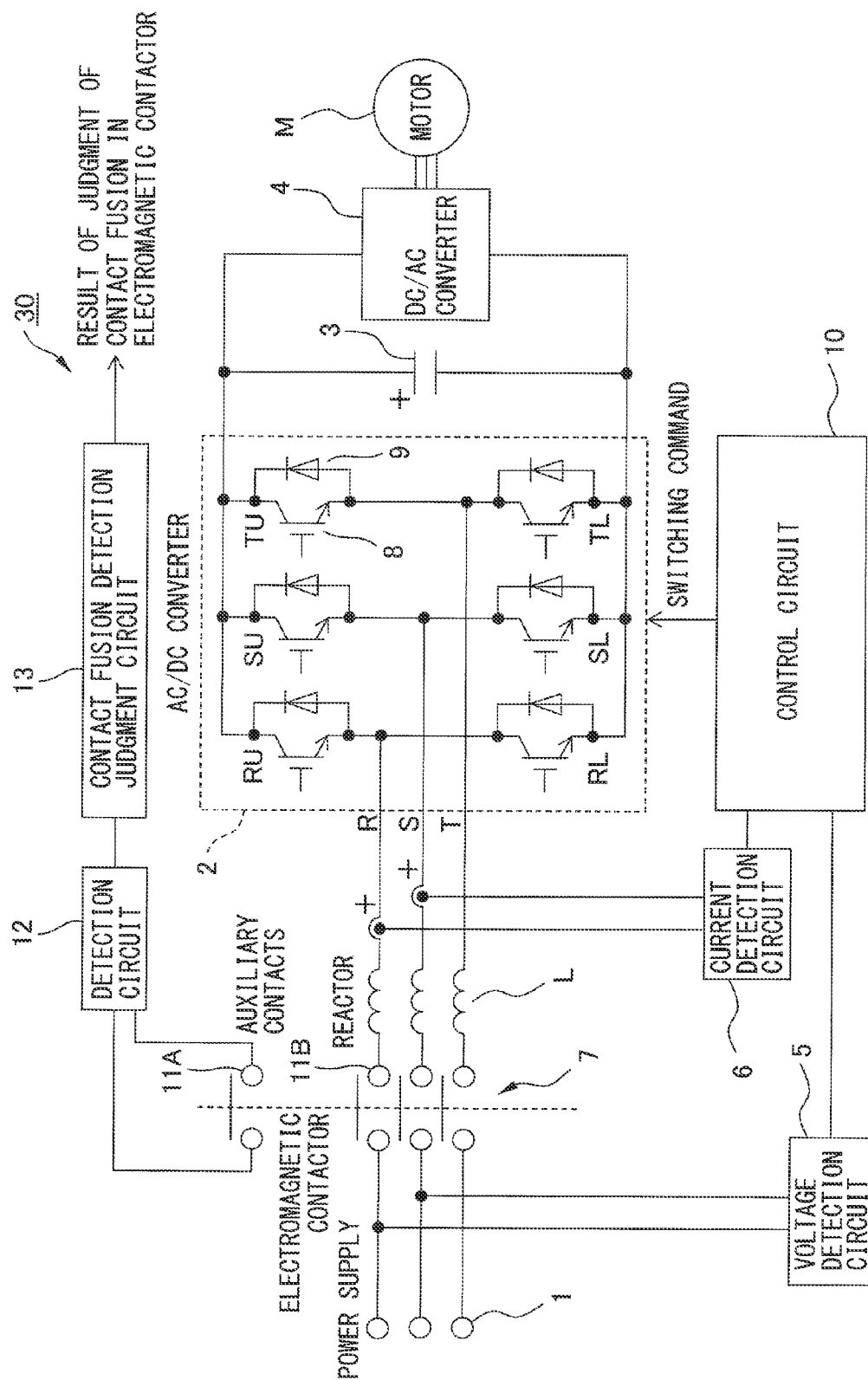
FIG. 1 is a circuit diagram which shows a circuit configuration which detects contact fusion in an electromagnetic contactor in a conventional motor drive device.

Below, referring to the drawings, a motor drive device which has a contact fusion detection function of an electromagnetic contactor of the present invention will be explained. However, it will be understood that the present invention is not limited to the drawings or the embodiment which is explained below. In the figures, the same component elements are assigned the same reference notations. Note that, for better understanding of the motor drive device having the function of detecting contact fusion in an electromagnetic contactor of the present invention, before explaining the embodiment of the present invention, the method of detection of fusion of a contact in an electromagnetic contactor in a motor drive device up to now will be explained using FIG. 1.

The conventional motor drive device 30 which is shown in FIG. 1 is one which drives a motor M which is provided at a not shown machine tool or industrial machine, robot, etc. Its input power supply 1 is usually a three-phase alternating current. The three-phase alternating current from the input power supply 1 is converted to direct current at an alternating current/direct current converter 2 (described as AC/DC converter 2 in the figure). The converted direct current is stored in a direct current capacitor 3 and is input to a direct current/alternating current converter 4 (described as DC/AC converter 4 in the figure). The DC/AC converter 4 converts the input direct current to a desired frequency of alternating current to drive the motor M.

Near the input power supply 1 of the motor drive device 30, a voltage detection circuit 5 which detects the voltage of the input power supply 1 and a current detection circuit 6 which detects the input current are provided. The detection values are input to a control circuit 10. L indicates a reactor. Further, the input power line of the voltage detection circuit 5 and the current detection circuit 6 is provided with an electromagnetic contactor 7 which cuts off the input to the AC/DC converter 2 of the three-phase power supply. Note that, in the following explanation, the phases of the three-phase alternating current will be explained as the R-phase, S-phase, and T-phase.

The control circuit 10 generates a switching command signal based on the signals from the voltage detection circuit 5 and the current detection circuit 6 and inputs it to the AC/DC converter 2. The AC/DC converter 2 is configured by a three-phase bridge circuit which is comprised of a switching device 8 and a diode 9. The switching device 8 is controlled to turn on/off by a signal from the control circuit 10. As the different phases of the three-phase bridge circuit in the AC/DC converter 2 may be configured from the upper arm and lower arm. RU indicates the upper arm of the R-phase, and RL the lower arm of the R-phase. Therefore, the upper arm of the S-phase is indicated by SU and the lower arm by SL, while the upper arm of the T-phase is indicated by TU and the lower arm by TL.

The electromagnetic contactor 7 which is set at the input power line of the motor control circuit 30 is provided with an auxiliary contact 11A. The auxiliary contact 11A operates linked with a main contact 11B of the electromagnetic contactor 7. The conventional motor control circuit 30 is provided with a detection circuit 12 which detects conduction of the auxiliary contact 11A and a contact fusion detection judgment circuit 13.

When detecting fusion of the main contact 11B in the electromagnetic contactor 7, the electromagnetic contactor 7 is turned on/off in the state when making the motor M stop, the opened/closed state of the auxiliary contact 11A of the electromagnetic contactor 7 at this time is monitored by the detection circuit 12 and the contact fusion detection judgment circuit 13, and the result of judgment of contact fusion in the electromagnetic contactor is output. That is, the contact fusion detection judgment circuit 13 outputs the result of judgment of contact fusion in the electromagnetic contactor that there is no fusion of the main contact 11B in the electromagnetic contactor 7 if the auxiliary contact 11A is closed when turning the electromagnetic contactor 7 on and it is is opened when turning it off. On the other hand, when the auxiliary contact 11A is closed when turning the electromagnetic contactor 7 off, the contact fusion detection judgment circuit 13 outputs the result of judgment of contact fusion in the electromagnetic contactor that there is fusion of the main contact 11B in the electromagnetic contactor 7.

Figure 2:
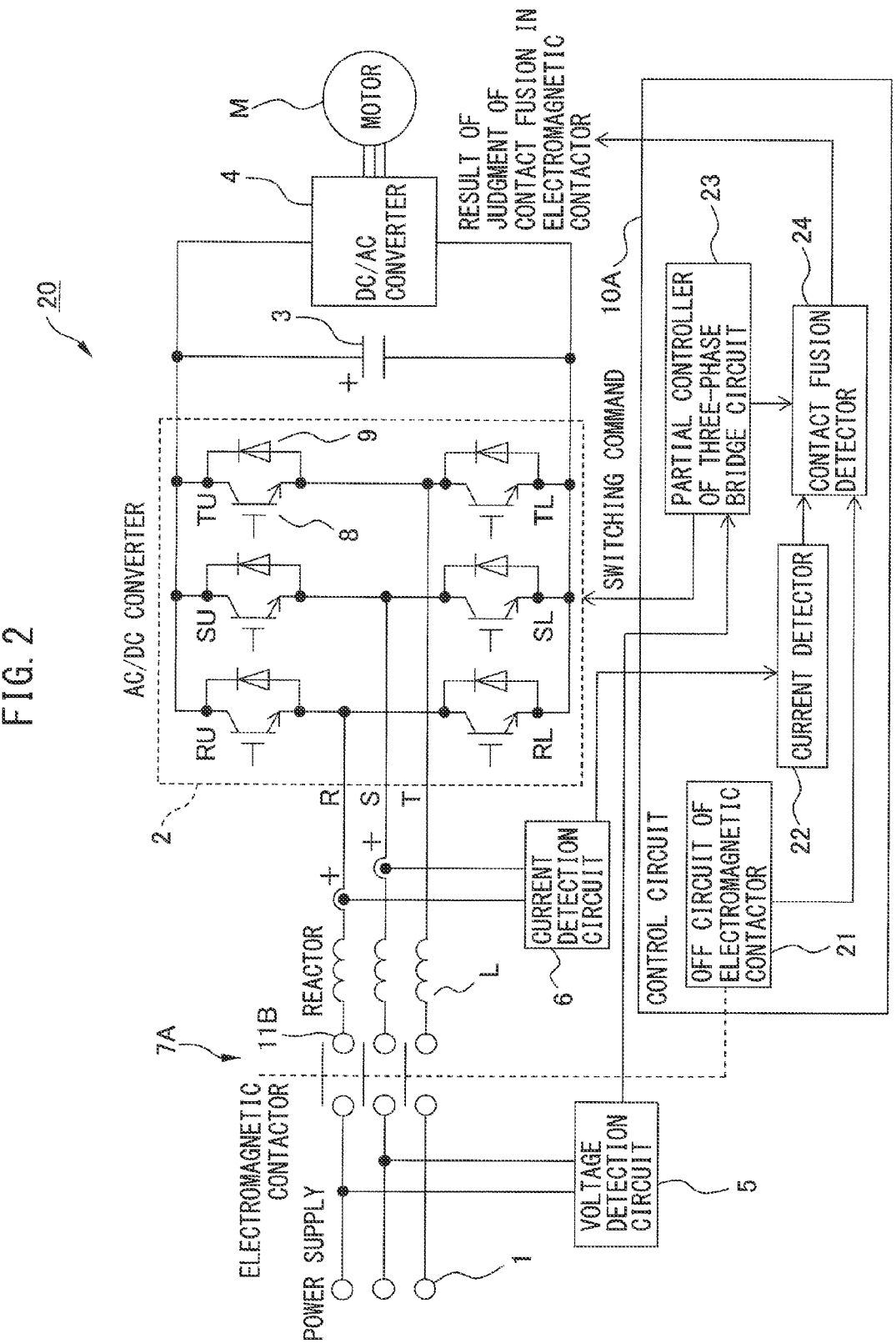
FIG. 2 is a circuit diagram which shows a circuit configuration which detects contact fusion in an electromagnetic contactor in a motor drive device of the present invention.

FIG. 2 shows the configuration of one embodiment of a motor control circuit 20 of the present invention. The points where the motor control circuit 20 of the present invention differs from the conventional motor control circuit 30 which is explained in FIG. 1 are the structure of the electromagnetic connector 7A, the structure of the control circuit 10A, and the lack of a detection circuit 12 and a contact fusion detection judgment circuit 13. Accordingly, component members in the motor control circuit 20 of the present invention which are the same as the component members of the conventional motor control circuit 30 are assigned the same reference notations and explanations will be omitted.

The electromagnetic contactor 7A which is provided at the input power line of the motor control circuit 20 of the present invention is provided with the main contact 11B, but the auxiliary contact 11A is omitted. On the other hand, the control circuit 10A is provided with an off circuit 21 of an electromagnetic contactor which turns the electromagnetic contactor 7A off, a current detector 22 which detects if a current is flowing by a signal from the current detection circuit 6, a partial controller 23 of the three-phase bridge circuit, and a contact fusion detector 24. The result of judgment of contact fusion in the electromagnetic contactor 7A is output from this contact fusion detector 24.

Figure 3:
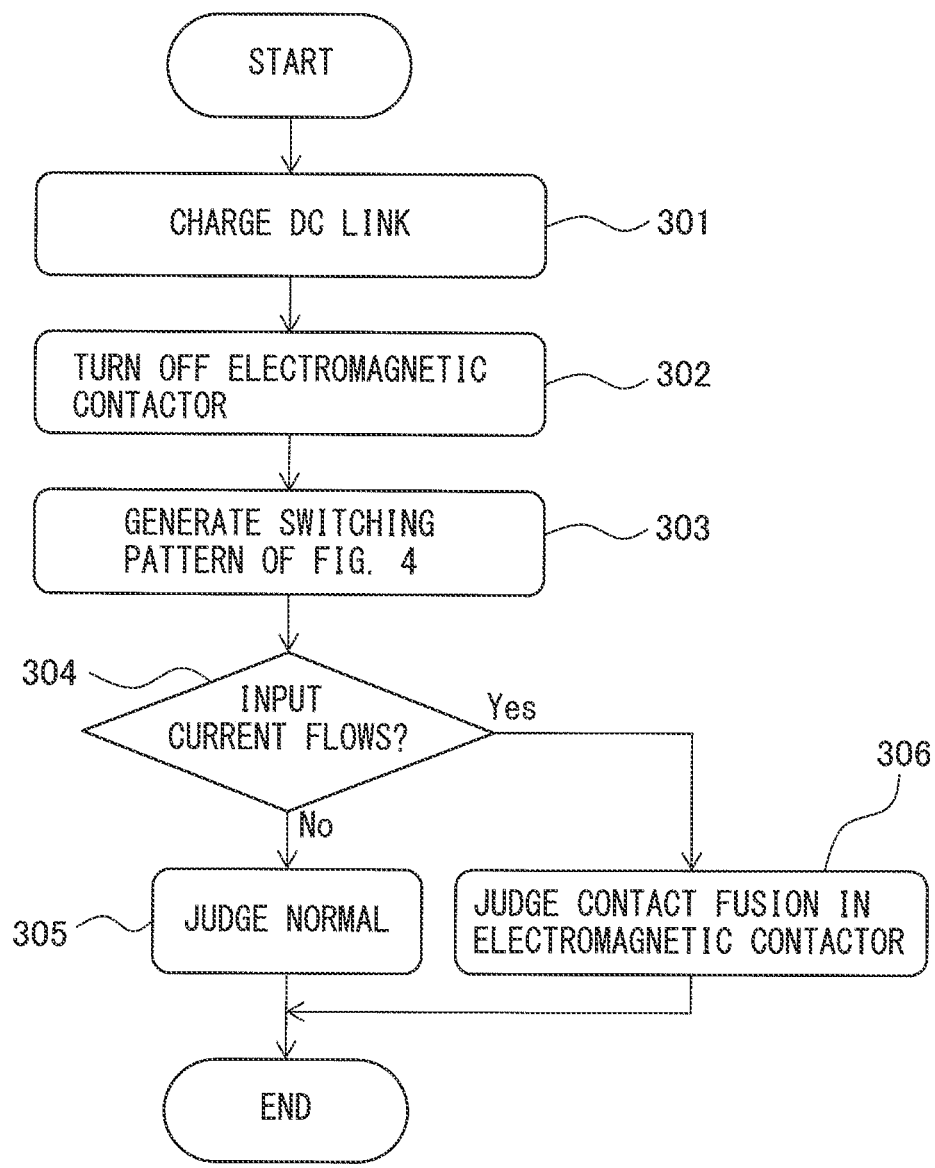
FIG. 3 is a flow chart which shows a contact fusion detection routine performed by a control circuit of the circuit which is shown in FIG. 2.
Figure 4:
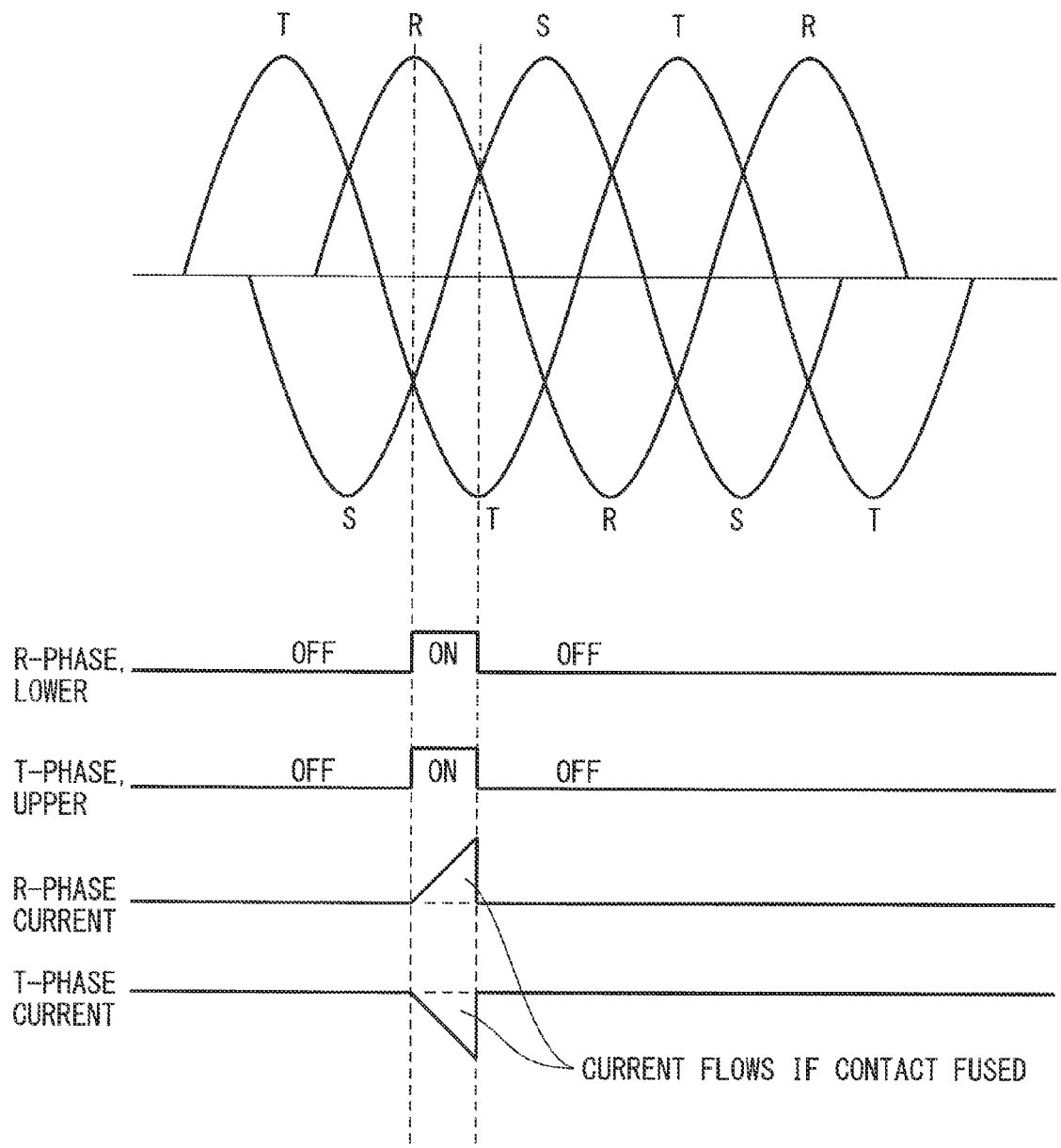
FIG. 4 is a waveform diagram which shows a switching pattern for detecting contact fusion which is performed by a control circuit of the circuit which is shown in FIG. 2.

Here, the flow chart of the control routine which is shown in FIG. 2 and FIG. 3 and the waveform diagram which is shown in FIG. 4 will be used to explain the judgment of contact fusion in the electromagnetic contactor 7A according to the control circuit 10A of the present invention. Note that, the bridge circuit of the AC/DC converter 2 is provided with an upper arm RU and lower arm RL of the R-phase, an upper arm SU and lower arm SL of the S-phase, and an upper arm TU and lower arm TL of the T-phase.

The control circuit 10A, first, charges a DC link, that is, charges the DC capacitor 3 which is shown in FIG. 2 (step 301). Next, in the state where the DC link is charged, the off circuit 21 of the electromagnetic contactor is used to turn the electromagnetic contactor 7A off (step 302).

In this state, the partial controller 23 of the three-phase bridge circuit uses the signal which is input from the voltage detection circuit 5 as the basis to turn on the upper arm of one phase of the three-phase bridge circuit for the phase of the lowest input voltage and turn on the lower arm of one phase of the same bridge circuit for the phase of the highest input voltage. For example, as shown in FIG. 4, the upper arm TU of the T-phase of the three-phase bridge circuit is turned on and the lower arm RL of the R-phase is turned on. This state is shown as "GENERATE SWITCHING PATTERN OF FIG. 4" at step 303. At this time, the current detector 22 detects if an input current flows to the T-phase and R-phase.

Information on what side arm of what phase of the three-phase bridge circuit the partial controller 23 of the three-phase bridge circuit has turned on, off information of the electromagnetic contactor 7A, and information on any current by the current detector 22 are input to the contact fusion detector 24. The contact fusion detector 24 uses the information as the basis to judge if an input current flows to the T-phase and R-phase (step 304).

In this operation, if the electromagnetic contactor 7A has no fused contact, the off circuit 21 of the electromagnetic contactor turns the electromagnetic contactor 7A off, so the three-phase bridge circuit is cut off from the power supply and no input current flows. FIG. 4 shows when the lower arm of the R-phase and the upper arm of the T-phase are on and current flows to the R-phase and T-phase by the solid line and when it does not flow by the broken line. On the other hand, when the electromagnetic contactor 7A has a fused contact, the three-phase bridge circuit is not cut off from the power supply, so the input current flows. It is possible to use the presence of current at this time to check for contact fusion in the electromagnetic contactor.

When, in the judgment of step 304, the contact fusion detector 24 detects that input current does not flow to the T-phase and the R-phase (NO), the routine proceeds to step 305 where the contact fusion detector 24 judges that the electromagnetic contactor 7A is normal. On the other hand, when, in the judgment of step 304, the contact fusion detector 24 detects that the input current flows to the T-phase and R-phase (YES), the routine proceeds to step 306 where the contact fusion detector 24 judges that the electromagnetic contactor 7A has a fused contact. Further, the contact fusion detector 24 outputs the result of judgement of contact fusion of the electromagnetic contactor to the control circuit 10A.

The above judgment by the control circuit 10A can be performed at every certain time interval. That is, the control circuit 10A can operate to turn the electromagnetic contactor 7A off at every certain time interval, generate the above-mentioned switching pattern, and judge any contact fusion in the electromagnetic contactor 7A.

Figure 5:
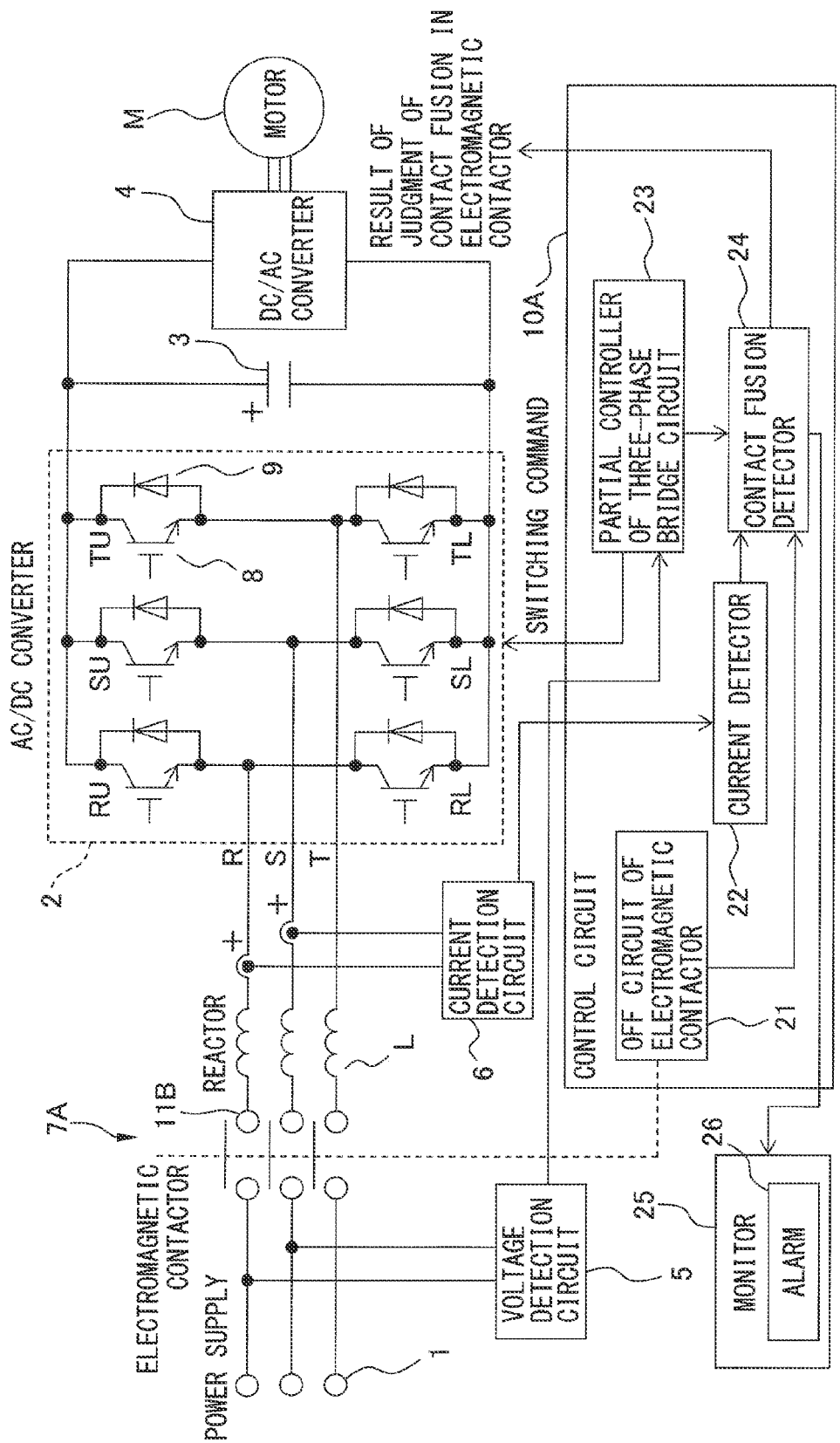
FIG. 5 is a circuit diagram which shows an embodiment which connects a monitor which has a built-in alarm to the control circuit which is shown in FIG. 2.

Further, as shown in FIG. 5, if connecting a monitor 25 as a display to the control circuit 20 of the motor control circuit 20, any contact fusion in the electromagnetic contactor 7A can be confirmed by the monitor 25. Furthermore, if building into the monitor 25 an alarm 26, when fusion of the main contact 11B of the electromagnetic contactor 7A is judged, the alarm 26 can be activated and the operation stopped.

In this way, in the present invention, an input voltage circuit 5 and an input current detection circuit 6 of a function which the motor drive device 20 is originally provided with are utilized for the control circuit 10A to judge any contact fusion in the electromagnetic contactor, so no additional costs are incurred.

Above, the present invention was explained with reference to preferred embodiments, but a person skilled in the art would understand that various modifications and changes can be made without departing from the scope of the later explained claims.

What is claimed is:

1. A motor drive device which comprises an AC/DC converter which converts an alternating current voltage which is supplied from a three-phase alternating current power supply to a direct current voltage, a detection circuit of the input power voltage, and a detection circuit of the input current, in which motor drive device, said AC/DC converter comprising a three-phase bridge circuit comprised of a switching device and a diode, and said detection circuit of an input power voltage and detection circuit of an input current having an electromagnetic contactor which turns the input power line on/off set between them, said motor drive device provided with the following:
   an off circuit of an electromagnetic contactor for turning off said electromagnetic contactor in the state charged by the direct current voltage of said AC/DC converter;
   a partial controller of the three-phase bridge circuit for turning on the upper arm of one phase of said three-phase bridge circuit for the phase with the lowest input voltage and for turning on the lower arm of one phase of said three-phase bridge circuit for the phase with the highest input in the state where the off circuit of said electromagnetic contactor turns off said electromagnetic contactor;
   a current detector for detecting if current is flowing or not flowing in the state where said partial controller of the three-phase bridge circuit has turned on said upper arm of one phase and said lower arm of one phase; and
   a contact fusion detector whereby said current detector detects said electromagnetic contactor is normal when not detecting current and said current detector detects that it has a fused contact when detecting current in the state where said partial controller of the three-phase bridge circuit turns on said upper arm of one phase and said lower arm of said one phase.

2. The motor drive device according to claim 1, wherein said off circuit of said electromagnetic contactor turns off said electromagnetic contactor at every certain time interval, and
   said partial controller of the three-phase bridge circuit, said current detector, and said contact fusion detector operate every time said electromagnetic contactor is turned off.

3. The motor drive device according to claim 1, wherein said contact fusion detector is connected to a display, and results of judgment of said contact fusion detector can be visually confirmed through said display.

4. The motor drive device according to claim 1 or 2, wherein said contact fusion detector is connected to an alarm, and said contact fusion detector activates said alarm when said contact fusion detector detects contact fusion.

* * * * *